United States Patent

[11] 3,601,005

| [72] | Inventor | John C. McKusick<br>3495 E. Pico Blvd., Los Angeles, Calif. 90023 |
|---|---|---|
| [21] | Appl. No. | 752,217 |
| [22] | Filed | Aug. 13, 1968 |
| [45] | Patented | Aug. 24, 1971 |

[54] CAM-FORMING METHOD AND APPARATUS
11 Claims, 7 Drawing Figs.

[52] U.S. Cl. .................................................. 90/13.9,
51/100 R, 83/410
[51] Int. Cl. ...................................................... B23c 1/18
[50] Field of Search ............................................ 90/13.9,
13.3, 13.4, 13.6, 13.7, 11.3; 51/100; 82/14;
83/413, 410

[56] References Cited
UNITED STATES PATENTS

| 2,179,211 | 11/1939 | Flygare .......................... | 51/100 |
| 2,333,985 | 11/1943 | Clark ............................. | 51/100 |
| 3,267,813 | 8/1966 | Walstrom ....................... | 90/13.3 |
| 3,426,645 | 2/1969 | Williams ........................ | 90/13.9 |
| 518,611 | 4/1894 | Kunze ............................ | 82/14 |

*Primary Examiner*—Gil Weidenfeld
*Attorney*—Harris, Kiech, Russell & Kern

ABSTRACT: A method and apparatus wherein a predetermined linear pattern is scanned at a given rate while a cam blank is rotated at a related rate and cut or marked at a radial distance which varies instantaneously with lateral changes in the linear pattern whereby the outer edge of or marking on the finished cam corresponds to the linear pattern.

Patented Aug. 24, 1971
3,601,005
2 Sheets-Sheet 1
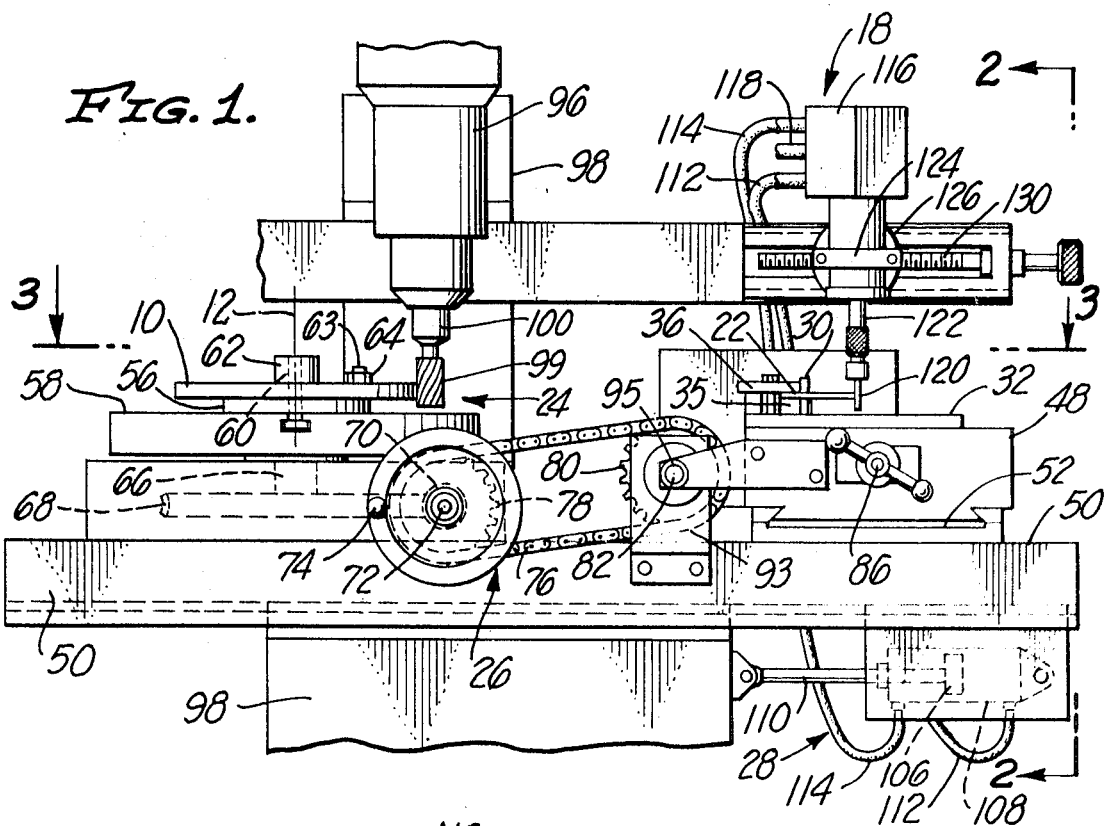
Fig. 1.
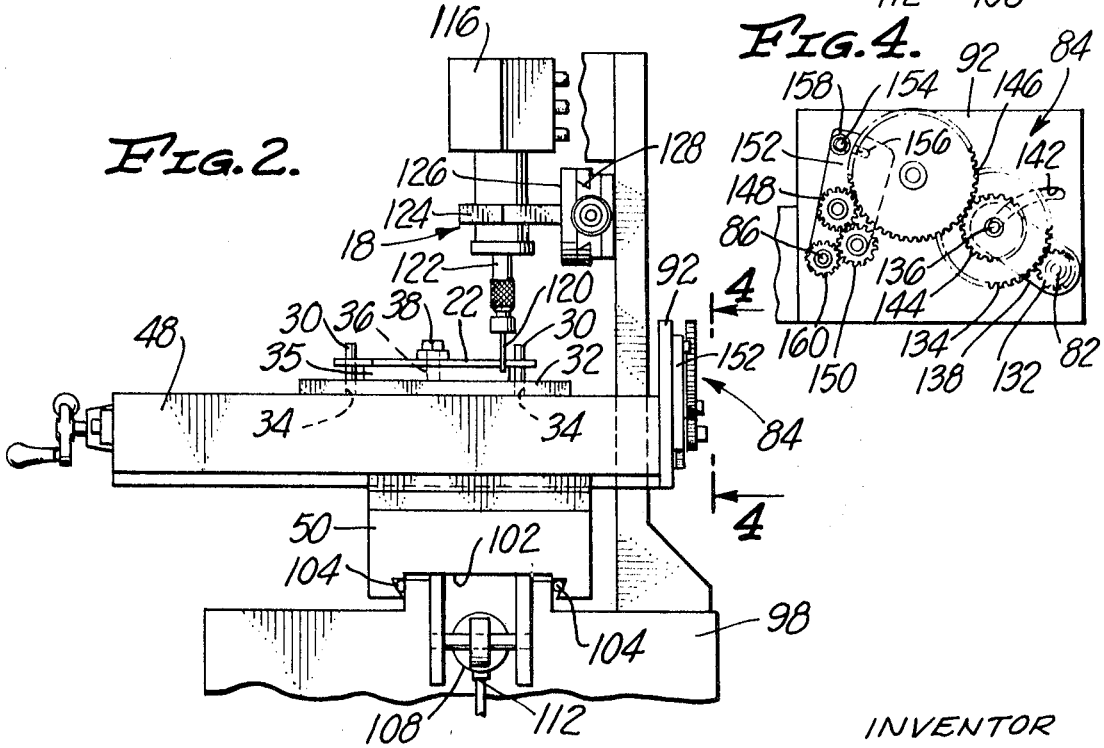
Fig. 2.
Fig. 4.
INVENTOR
JOHN C. MCKUSICK
BY HIS ATTORNEYS
HARRIS, KIECH, RUSSELL & KERN Patented Aug. 24, 1971  3,601,005
2 Sheets-Sheet 2
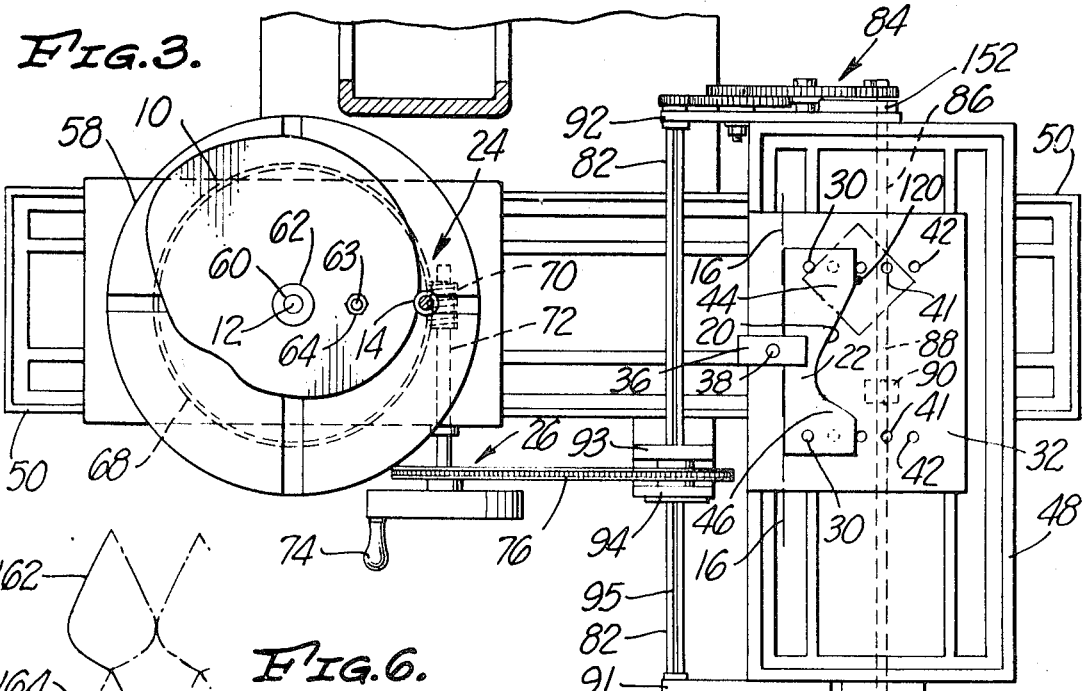
Fig. 3.
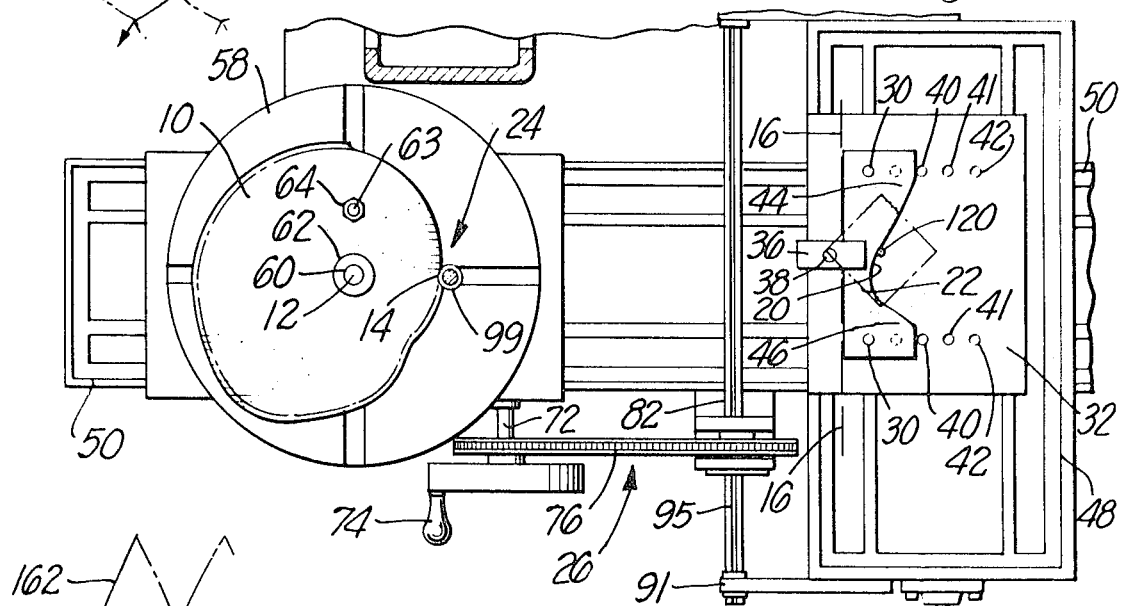
Fig. 5.
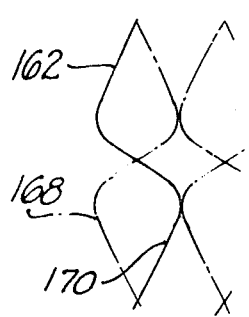
Fig. 6.
Fig. 7.
INVENTOR
JOHN C. MCKUSICK
BY HIS ATTORNEYS
HARRIS, KIECH, RUSSELL & KERN

CAM-FORMING METHOD AND APPARATUS

This invention relates generally to methods and apparatus for forming cams and more particularly to a method and apparatus for cutting or marking a rotary pattern on a cam blank which corresponds to a predetermined linear pattern. The invention is particularly appropriate for forming cams of various configurations which are used to guide sewing needles along ornamental stitching patterns for quilts and the like.

Conventional cams are usually formed by cutting their outside edges to conform to the shape of a master cam. Preparation of a master cam is therefore a necessary step which requires substantial time, effort and money. It is also a very critical step since any flaw in the master cam shape will automatically recur in the duplicate cam copies therefrom.

The manufacturing of such master cams typically involves the following steps: (1) laying out a rotary pattern about a center reference point; (2) measuring the radial location of the pattern at equal angular intervals such as every 2°; (3) drilling holes in the cam blank at those same radial distances and angular intervals; (4) cutting the cam blank between the holes along the approximate path of the cam pattern; and (5) carefully grinding the outside edge of the cam blank until it matches the rotary pattern as initially laid out. Production of master cams in the above fashion must be done by a skilled craftsman, and is therefore expensive. In addition, each step must be performed very carefully, and even when done so, there is a constant chance for error throughout the operation. Furthermore, whenever a cam of a different shape is needed, it is necessary to go through the complete painstaking process all over again.

Accordingly, it is a primary object of the present invention to eliminate the time, expense, and potential for error inherent in the tedious conventional preparation of master cams, and to provide a new and improved method and apparatus for forming master cams. Another primary object is to provide a method and apparatus for duplicating cams which eliminates the need for a master cam.

Another object is to provide a method and apparatus of the foregoing character which is relatively inexpensive, easy to perform and operate, and requires very little time to produce a finished cam of precise specifications.

A further object is to provide a method and apparatus of the foregoing character wherein the desired rotary pattern of the cam is laid out in a linear pattern defined in rectangular coordinates, the cam blank being cut or marked to form a rotary pattern which corresponds to the linear pattern.

A more specific object is to provide an apparatus of the foregoing character which includes scanner means for scanning the linear pattern at a predetermined rate to sense its shape relative to a reference line, and includes cutter means for cutting the outside edge of the cam blank so that it corresponds to the shape of the linear pattern. A related object is to provide drive means for rotating the cam blank relative to the cutter means at a rate proportional to the predetermined scanning rate of the scanner means.

Another object is to provide an apparatus of the foregoing character which includes means for varying the radial cutting distance between the cutter means and an axis about which the cam is rotated so that the radial cutting distance is always proportional to the instantaneous lateral displacement of the linear pattern relative to the reference line.

Still another object is to provide varying means in apparatus of the foregoing character for moving the scanner means laterally relative to the linear pattern to keep the scanner means directly above the linear pattern.

A further object is to provide an apparatus and method of the foregoing character which produces cams adaptable for guiding sewing needles in stitching patterns including a basic pattern successively repeated. A related object is to produce cams capable of guiding sewing needles along a stitching pattern which includes a basic pattern alternated with its reflection as well as cams capable of such guiding when the basic pattern is alternated with its reversal.

The foregoing as well as other objects and advantages of the present invention may be more clearly understood by reference to the following detailed description when considered with the drawings, which by way of example only, illustrate one form of apparatus for forming cams and one method for forming cams embodying the invention.

In the drawings:

FIG. 1 is a side elevational view of a preferred embodiment of a cam-forming apparatus;

FIG. 2 is an end elevational view of the embodiment of FIG. 1 taken along the line 2—2 in FIG. 1;

FIG. 3 is a sectional view taken along line 3—3 in FIG. 1 showing a tracer stylus contacting a prototype template at the first end of its linear pattern, with cutter means contacting a cam blank at a beginning incision point;

FIG. 4 is a side view taken along line 4—4 in FIG. 2 showing gear means for rotating a cam blank at a rate proportional to the movement of the template relative to the tracer stylus;

FIG. 5 is a sectional view similar to that of FIG. 3 showing the tracer stylus contacting the prototype template midway between the first and second ends of its linear pattern, with the cutter means contacting the cam blank at an incision point 90° removed from the beginning incision point;

FIG. 6 shows a stitching pattern produced by a sewing needle guided by a cam formed by turning the prototype template end for end without turning it over after the cam blank has been rotated its first 180°; and FIG. 7 shows stitching pattern produced by a sewing needle guided by the cam formed by turning the prototype template over without changing the location of the first and second ends of its linear pattern after the cam blank has been rotated the first 180°.

In general, the method of the present invention provides for the formation of a rotary pattern on a cam blank 10 which corresponds to a given linear pattern. The linear pattern can take various forms and includes any pattern which defines the path of a moving point—whether the path be curved or straight. The method includes scanning the linear pattern at a predetermined rate to sense its shape, rotating the cam blank 10 about an axis 12 at a rate which is a function of the scanning rate, and marking or cutting the rotating cam blank at point 14 whose location varies with the shape of the linear pattern. The rotary pattern formed on the cam blank can be a superficial removable marking, a groove, or the outside edge of the cam blank 10, so long as its rotary shape corresponds to the linear shape of the predetermined pattern. The shape of the linear pattern can be sensed in terms of its instantaneous lateral variations, or in terms of its instantaneous displacement from a reference such as reference line 16. In either case the invention provides for varying the radial marking or cutting distance as a function of the pattern shape.

In the method described hereinafter indicated, the outer edge of the cam blank 10 is cut to form a rotary pattern corresponding to a linear pattern. However, it is to be understood that the following description is just as applicable to a method and apparatus wherein a face of a cam blank is etched, grooved, or otherwise marked with a rotary pattern corresponding to a given linear pattern. Accordingly, while the terms "cutter," "cutting," and "incision" are employed hereinafter, they are deemed to include, within their meanings, means for marking, grooving etching, and the like, a face of a cam blank.

In the preferred method, the scanning, rotating, cutting, and varying steps are performed simultaneously and are related to the scanning in such a way that the rotation rate is proportional to the predetermined scanning rate, and the instantaneous radial cutting distance of the incision point 14 is proportional to the instantaneous lateral displacement of the linear pattern relative to the reference line 16. As used herein, radial cutting distance shall be identified so as to include the distance between the incision point 14 and the axis 12 as well as between the incision point and any reference circle concentric to the axis.

Speaking generally now of the apparatus for accomplishing or working the above-described method, it includes a scanner means 18 for traversing the linear pattern, such as an edge 20 of a prototype template 22 in a direction parallel to the reference line 16 to sense the instantaneous lateral displacement of the edge of the template relative to the reference line. Cutter means 24 is provided for cutting the cam blank 10 at the incision point 14; and drive means 26 is included for moving the scanner means 18 relative to the template 22 at a predetermined scanning rate and rotating the cam blank 10 at a rate proportional to the scanning rate. As the cam blank 10 is rotated about its axis 12 by the drive means 26, the cutter means 24 cuts the cam blank 10 at the incision point 14 which is displaced from the axis 12. In this regard, the radial cutting distance of the incision point 14 is regulated throughout the operation to be always proportional to the instantaneous lateral displacement of the linear pattern relative to the reference line 16. Means 28 is provided for varying the radial cutting distance in the aforesaid manner through operative association with the scanner means 18 as will be described hereinafter.

Referring more particularly to the preferred embodiment of the apparatus as shown in FIGS. 1, 2, 3, and 5, two pins 30 are attached to a support table 32 removably mounting the template 22 in a generally horizontal position on the support table, the left edge of the template being coincidental with the reference line 16 for purposes of discussion. The pins 30 are sized and spaced to fit a pair of holes 34 in the support table 32 and are long enough to secure the template 22 above the support table on a spacer 35, to allow for optimum operative contact of the scanner means 18 with the template 22 as will be described hereinafter.

During the scanning operation the template is secured by an overlying restraining bar 36 which is attached to the support table 32 by a bolt 38. The support table 32 includes other pairs of holes such as 40, 41, 42 to allow the template 22 to be secured in various positions parallel with and relative to the reference line 16. In the illustrated form the location of the holes 34 relative to the various pairs of holes 40, 41, 42 allows the template 22 to be turned over and repositioned without changing the location of a first end 44 and a second end 46 of the linear pattern as defined by the template edge 20. It is also possible to reposition the template 22 so that the first and second ends 44, 46 exchange locations, such repositioning being accomplished either by turning the template over or by turning it end for end without turning it over. The importance of such features in producing finished cams capable of guiding a sewing needle along the stitching patterns of FIG. 6 and 7 will be discussed hereinafter.

The support table 32 is fixedly attached to the top of a cross slide 48 supported in a dovetail way 52 of a carriage 50 for sliding movement transverse to the carriage 50 and in a direction parallel to the reference line 16. Thus, in the illustrated form of the invention, movement of the scanner means 18 relative to the template edge 20 in a direction parallel to the reference line 16 is accomplished by moving the cross slide 48 along the dovetailed way 52 transverse to the carriage 50—the scanner means being fixed.

While the scanner means 18 is scanning the linear pattern defined by the edge 20 of the template 22, the cam blank 10 is rotated about the axis 12. This is best shown in FIGS. 1, 3, and 5. As represented, the cam blank 10 is a flat, generally circular disc and is removably mounted in a horizontal plane on a relatively small spacer plate 56 secured to a rotary table 58. In this regard, a threaded stud 60 concentric with the axis 12 extends upwardly through the spacer 56 and a central opening in the cam blank 10. Above the top of the cam blank 10, the stud receives a nut 62 to connect the cam blank to the rotary table 58 concentric with the axis 12. A second stud 63 extends upwardly from the table and through the cam blank to receive a nut 64 to securely lock the blank in place relative to the table.

The rotary table 58 is also concentric with the axis 12 and is supported for rotation thereabout. In this respect, the table is journaled to the carriage 50 for turning about the axis 12 with an axle 66 extending downwardly therefrom to carry a relatively large drive wheel 68. The drive wheel 68 is engaged by a worm gear 70 on a horizontal drive shaft 72 parallel to the reference line 16. (See FIG. 3). A manual turning of a crank handle 74 secured to the drive shaft 72 rotates the drive wheel 68 and hence the rotary table 58 to turn the cam blank 10 about the axis 12.

The worm gear 70, drive shaft 72, and crank handle 74 comprise a portion of the previously referred to drive means 26 for simultaneously rotating the cam blank 10 and moving the scanner means 18 relative to the template 22 at a predetermined scanning rate. The balance of the illustrated drive means includes a continuous drive chain 76 passing around a drive sprocket wheel 78 on the drive shaft 72 and a transfer sprocket wheel 80 on a transfer shaft 82. The drive means 26 also includes a gear train 84 and a driven shaft 86 carrying a lead screw 88 mating with a threaded sleeve 90 fixedly connected to the cross slide 48. The transfer shaft 82 is journaled at opposite ends in support plates 91 and 92 connected to the cross slide 48 for movement therewith parallel to the drive and driven shafts 72 and 86. The transfer sprocket wheel 80 is maintained in alignment with the drive sprocket wheel 78 by a pair of spacer arms 93 and 94 extending upwardly from the carriage 50 on opposite sides of the transfer sprocket wheel with aligned holes for receiving the transfer shaft 82. To permit axial movement of the transfer shaft 82 with the cross slide 48 relative to the transfer sprocket wheel 80, the transfer shaft includes a longitudinally extending keyway 95 and the transfer sprocket wheel includes a spline (not shown) for riding in the keyway. Thus arranged, rotation of the drive sprocket wheel 78 in response to a turning of the hand crank 74 is transferred to the transfer sprocket wheel 80 by the continuous chain 76. The turning of the transfer sprocket wheel 80 produces a like turning of the transfer shaft 82 and a turning of the driven shaft 86 through the gear train 84. As the driven shaft turns, the lead screw 88 turns in the threaded sleeve 90 to produce transverse sliding movement of the cross slide 48 along the way 52 in the carriage 50 and hence movement of the template 22 along and relative to the stationary scanner means 18. It is thus appreciated that rotation of the drive shaft 72 causes the cross slide 48 and therefore the template 22 to be moved relative to the scanner means in a direction parallel to the reference line 16 while at the same time causing proportional rotation of the cam blank 10 about the axis 12. The proportional and directional factors relating the scanning rate and the rotational rate are determined by the size and arrangement of the gears within the gear train as will be described hereinafter.

While the drive means 26 is simultaneously moving the linear pattern along the scanner means 18 and rotating the cam blank 10 about the axis 12, the cutter means 24 is cutting into an edge of the cam blank and, in response to operation of the control means 28, is cutting the edge of the cam blank to form a rotary pattern corresponding to the linear pattern. In this regard, the cutter means 24 contacts the edge of the cam blank 10 at the incision point 14 displaced from the axis 12 and on a line therewith normal to the reference line 16. As changes occur in the lateral displacement of the linear pattern from the reference line 16, the means 28 changes the radial cutting distance of the incision point 14 to maintain the radial cutting distance proportional to the instantaneous lateral displacement of the linear pattern.

To accomplish this, the illustrated form of the cutter means 26 comprises a conventional milling machine 96 fixed to a stationary frame 98 for the apparatus and including a vertical milling spindle 99 mounted in a milling head 100 for rotation about a substantially vertical axis in response to operation of a drive motor (not shown). The spindle 99 engages the edge of the cam blank 10 at the incision point 14 and is of sufficient length to extend downwardly beyond the lower surface of the cam blank into the space provided by the spacer plate. This assures an even cutting of the edge of the cam blank 10 during rotation thereof relative to the turning spindle.

To maintain the radial cutting distance of the incision point 14 proportional to the instantaneous lateral displacement of the linear pattern relative to the reference line 16, the means 28 comprises apparatus responsive to the operation of the scanner means 18 for longitudinally moving the carriage 50 and hence the rotary table 58 and cam blank 10 toward and away from the turning spindle 99. In this regard, the carriage 50 is supported for longitudinal sliding movement in a horizontal plane and in a direction normal to a vertical plane including the reference line 16. Such support for the carriage 50 is most fully represented in FIG. 2 and comprises a longitudinally extending dovetail way 102 for riding along a pair of stationary guide rods 104 fixed to the support frame 98.

The apparatus of the means 28 responsive to operation of the scanner means 18 for maintaining the radial cutting distance proportional to the lateral displacement of the linear pattern relative to the reference line 16 may take various forms. Therefore, it is by way of example only that the illustrated means 28 comprises a piston 106 supported within a cylinder 108 and connected to the frame 98 by a horizontal piston rod 110. The cylinder 108 is fixedly secured to the carriage 50 and is adapted to slide on the piston 106, and hence produce longitudinal movement of the carriage 50 along the way 102, in response to fluid pressure differentials across the piston within the cylinder. In this regard, air hoses 112 and 114 are connected at right and left ends of the cylinder (when viewed in FIG. 1) and to a conventional valve controller 116 included in the illustrated form of the scanner means 18. Compressed air is supplied from a source through an inlet hose 118 to the valve controller 116 and hence to the air hoses 112 and 114 to the cylinder 108. When the air pressure in the right end of the cylinder 108 exceeds the air pressure in the left end, the cylinder drives the carriage 50 and cam blank 10 to the right until the pressure differential across the piston disappears. When the pressure in the left end of the cylinder 108 exceeds the pressure in the right end, the cylinder drives the carriage 50 and the cam blank 10 to the left until the pressure differential disappears. In this manner, operation of the cylinder 108 and piston 106 in response to air pressure differentials across the piston produces movement of the carriage 50 in a horizontal plane and normal to a vertical plane including the reference line 16 to regulate the radial cutting distance of the incision point 14 for the cutter means 24.

Various forms of conventional scanners may be employed to control operation of the illustrated means 28 such that the radial cutting distance is at all times proportional to the instantaneous lateral displacement of the linear pattern relative to the reference line 16. It is therefore by way of example only that the illustrated scanner means 18 includes a vertical tracer stylus 120 in addition to the conventional valve controller 116. The tracer stylus 120 is of conventional structure having an upper end housed within a cylindrical case 122 where it is connected to the valve controller 116.

As illustrated in FIGS. 2 and 3, the case 122 is vertically supported above the template 22 by a horizontal arm 124. The horizontal arm 124, in turn, is connected to a slide member 126. The slide 126 is supported for sliding movement along a dovetail way 128 in a vertical extension of the frame 98 normal to a vertical plane including the reference line 16. Thus, the tracer stylus 120 and valve controller 116 are supported for lateral movement toward and away from the edge 20 of the template 22 to permit preadjustment of the lower end of the stylus relative to the template prior to the start of scanning operation. In this regard, the apparatus includes a horizontal lead screw 130 journaled to the vertical extension of the frame 98. THe lead screw threadedly engages the slide member 126 and functions to selectively position the slide along the way 128 and hence to initially set a side of the lower end of the stylus lightly against the edge 20 of the template 22. The previously referred to spacing between the template 22 and the support table 32 allows the lower end of the tracer stylus 120 to extend below the template and assures proper lateral contact between the stylus and the template edge 20.

The connection of the tracer stylus 120 to the valve controller 116 is of a conventional and well-known nature. Basically, the lower end of the stylus 120 is supported for limited lateral movement with lateral changes in the moving linear pattern defined by the edge 20 of the template 22. By means of the lateral movements imparted tote stylus, the lateral changes, and hence the lateral displacement of the edge 20 relative to the reference line 16 are transformed into signals controlling the means 28 to regulate the radial cutting distance of the incision point 14. More particularly, the upper end of the stylus 120 is biased and adapted to control valves (not shown) within the controller 116 such that when the lower end of the stylus is in a median lateral position against the edge 20, the valves within the controller close ports to the air hoses 112 and 114. When the stylus 120 is urged by the edge 20 from the median lateral position away from the reference line 16, as by an increase in the lateral displacement of the pattern, the upper end of the stylus effects an opening of the hose 114 and a closing hose 112. When the lateral displacement of the edge 20 relative to the reference line 16 decreases and the biasing of the stylus 120 urges it from its median lateral position towards the reference line 16, the upper end of the stylus member effects an opening of the hose 112 and a closing of the hose 114.

Thus, as the template 22 is driven with the cross slide 48 along the dovetail way 52, the edge 20 bears against the lower end of the stylus 120. So long as the stylus 120 remains in its median lateral position as preadjusted by the lead screw 130, the hoses 112 and 114 remain closed and the means 28 maintain a uniform and predetermined radial cutting distance for the incision point 14. As the lateral displacement of the linear pattern relative to the reference line 16 begins to decrease, however, the lower end of the stylus 120 moves slightly toward the reference line 16 to effect an opening of the hose 112 through the valve controller 116 and an increase air pressure in the right end of the cylinder 108. This produces a movement of the carriage to the right when viewed in FIG. 1 to reduce the radial cutting distance of the incision point 14. Simultaneously, and since the cross slide 24 is supported by the carriage 50, the template 22 moves toward the stylus 120 to bring the stylus back to the median lateral position. As this occurs the air pressures in the right and left ends of the cylinder balance each other. When the lateral displacement of the linear pattern relative to the reference line 16 begins to increase, a reverse operation takes place, the stylus 120 being urged away from the reference line to effect an opening of the hose 114 leading to the left end of the cylinder 108. This produces a movement of the carriage 50 to the left to increase the radial cutting distance of the incision point 14 simultaneously with a return of the stylus 120 to its median lateral position and a balance of air pressures across the piston within the cylinder.

From the foregoing discussion, it is appreciated that the scanner means 18 and the means 28 combine to form a servomechanism for continuously maintaining the stylus 120 in a median lateral position despite changes in the lateral displacement of the edge 20 of the template 22 relative to the reference line 16. In this manner, the servomechanism continuously maintains the radial cutting distance of the incision point 14 proportional to the instantaneous lateral displacement of the linear pattern defined by the edge 20 relative to the reference line.

In the foregoing description, the operation of the means 28 and scanner means 18 has been described with reference to the edge 20 of the template 22 facing away from the reference line 16. When it is desired to shape the cam blank 10 with the edge 20 of the template 22 facing toward the reference line 16, it is necessary to reverse the connections of the air hoses 112 and 114 to the ends of the cylinder 108 and to preadjust the scanner means 18 with the lead screw 130 such that the lower end of the stylus 120 is initially in a median lateral position and biased toward the edge 20 facing the reference line 16. Having made the foregoing hose connection changes and preadjustment of the stylus 120, the operation of the scanner means 18 and means 28 to control the radial cutting distance to be proportional to the instantaneous lateral displacement of the edge 20 from the reference line 16 is substantially as previously described.

As mentioned before, the proportional and directional factors relating the scanning rate of the scanner means 18 and the rotational rate of the cam blank 10 are determined by the arrangement of the gears within the gear train 84. Referring more specifically to FIG. 4, the gear train 84 is represented as including a relatively small spur gear 132 supported for turning with the transfer shaft 82 and mating with a relatively large reduction gear 134. The reduction gear 134 is supported for turning and axial sliding movement on a short axle 136 pinned to a pivot plate 138. The pivot plate is supported for swinging movement on the transfer shaft 82 and the axle 136 is adapted to ride in an arcuate slot 142 in the support plate 92 for the transfer shaft. Fixed to an outer face of the reduction gear 134 is a second reduction gear 144 of one-half the radius of the reduction gear 134. The reduction gear 144 is illustrated in FIG. 4 as mating with an idler gear 146 connected to the support plate 92. The idler gear mates with either of two reversing gears 148 and 150 carried on a plate 152 hinged for swinging movement on the driven shaft 86. In this regard, a pin 154 extends from the support plate 92 through an arcuate slot 156 in the plate 152 to receive a locking nut 158 for securing the pivot plate in one of two positions. The first position is with the reversing gear 148 mating with the idler gear 146 and the reversing gear 150 mating with a gear 160 on the driven shaft 86. The second position is with the reversing gear 148 disengaged from the idler gear 146 and the reversing gear 150 mating with both the idler gear and the spur gear 160.

With the gear train 84 arranged as illustrated in FIG. 4, that is with the reduction gears in the first position, a turning of the transfer shaft 82 produces a turning of the driven shaft 86 to drive the cross slide 48 away from the viewer in FIG. 1. The gear reduction provided by the gears 134 and 144 is such that the scanner means 18 scans the entire edge 20 of the template 22 from the ends 44 to 46 while the cam blank 10 is rotated through a full 360°. When it is desired to change the gear ratio to provide for a complete scan of the edge 20 while rotating the cam blank 180°, the pivot plate 138 is swung upwardly to disengage the reduction gear 144 from the idler gear 146 and the reduction gears 134 and 144 are slipped forward such that the reduction gear 134 mates with both the spur gear 132 and the idler gear 146. With such an arrangement, it may be desired to reverse the scan of the template 22 after completing a 180° rotation of the cam blank 10. This may be accomplished by swinging the plate 152 and the reversing gears 148 and 150 to the second position. When this occurs, the cross slide 48 and hence the template 22 will move forward toward the viewer in FIG. 1 while the cam blank 10 continues to rotate in the same direction.

From the foregoing, it is to be appreciated that changes in the scanning direction accompanied by changes in the position of the template 22 on the cross slide 48 may be undertaken to produce different shapes for the edge surface of the cam formed from the rotating cam blank 10. For example, the template 22 may be used to produce finished cams capable of guiding a sewing needle along the stitching patterns illustrated in FIGS. 6 and 7. In this regard, and in the description which follows, all of the scanning is done while the idler gear 146 is engaged by the reduction gear 134 in order that the cam blank 10 is rotated only 180° while the template edge 20 is scanned from one end to the other.

Referring first to FIG. 6, a stitching pattern which follows continuously along a path 162 and then a repeating path 164 results from using a cam which was shaped by positioning the template 22 as shown in FIGS. 6 and 7, and scanning along the template edge 20 from its first end 44 to its second end 46 while the cam blank 10 is rotated 180°. The template 22 is then turned over so that its first and second ends 44, 46 exchange locations, at which time the reversing gear 148 is disengaged from the idler gear 146 and the reversing gear 150 is engaged thereto. Scanning is then effected in reverse along the template edge 20 from its newly located first end 44 to its newly located second end 46 while the cam blank 10 is rotated in the same direction through another 180°.

A stitching pattern which follows continuously along a path 162 and then a reflected repeating path 166 results from using a cam shaped as initially described above, except that midway through the operation when the template 22 is repositioned, it is turned end for end without turning it over, so that its first and second ends 44, 46 exchange locations. At this time, it is also necessary to reverse the connections of air hoses 112 and 114 since the template edge 20 is now facing toward the reference line 16. Scanning is then effected in reverse as described above.

Referring to FIG. 7, a stitching pattern which follows continuously along a path 162 and then an inverted path 168 results from using a cam shaped as initially described above, except that midway through the operation there is no repositioning of the template 22. Therefore the scanning in reverse goes along the template edge 20 from its second end 46 back to its first end 44 while the cam blank 10 is rotated through its second 180°.

A stitching pattern which follows continuously along a path 162 and then a reflected inverted path 170 results from using a cam shaped as initially described above, except that midway through the operation when the template 22 is repositioned, it is turned over without changing the location of its first and second ends 44, 46. At this time, it is also necessary to reverse the connections of air hoses 112 and 114 since the template edge 20 is now facing toward the reference line 16. Scanning is then effected in reverse along the template edge 20 from its second end 46 back to its first end 44 while the cam blank 10 is rotated through its second 180°.

It will be appreciated from all of the foregoing that, although a specific embodiment has been illustrated and described, the invention contemplates the use of variously shaped linear patterns in conjunction with apparatus providing a unitary proportional factor between the instantaneous lateral displacement of the linear pattern and the related changes in the radial cutting distance, and with apparatus which also provides various proportional factors between the predetermined scanning rate along the linear pattern and the rotation of the cam blank. Changes and modification may be made in the exemplary form without departing from the spirit of the invention. It is therefore intended that the present invention be limited in scope only by the terms of the following claims.

I claim:
1. A method of forming a cam having a rotary pattern corresponding to a given linear pattern comprising the following simultaneous steps:
scanning the linear pattern in a first direction at a predetermined rate to sense instantaneous lateral changes in said linear pattern;
rotating a cam blank about an axis of rotation and in a fixed plane substantially normal to said axis and at a speed which is a function of said predetermined rate; and
cutting a rotary pattern in said fixed plane on said rotating cam blank by providing relative movement between the rotary cam blank and a cutter in the direction of said plane and at a radial cutting distance which varies with the instantaneous lateral change in said linear pattern.
2. The method of claim 1 including
sensing the instantaneous lateral displacement of said linear pattern relative to a predetermined reference as said linear pattern is scanned, and
simultaneously varying said radial cutting distance as a function of said instantaneous lateral displacement.

3. The method of claim 1 wherein said steps include rescanning at least a portion of said linear pattern in a direction opposite to said first direction.

4. The method of claim 1 wherein said steps include flipping said pattern and rescanning at least a portion of said pattern.

5. Apparatus for forming a cam blank into a cam having a rotary pattern around an axis of rotation of said blank, said rotary pattern corresponding to a given linear pattern, including:

scanner means for traversing the linear pattern and for sensing the instantaneous lateral changes thereof relative to a predetermined reference line;

first mounting means mounting said cam blank for rotation about and in a plane substantially normal to said axis of rotation, while preventing movement of said cam blank in the direction of said axis of rotation;

cutter means for cutting the rotating cam blank at an incision point displaced from said axis of rotation;

second mounting means fixedly mounting said cutter means in the direction of said axis of rotation;

drive means for moving said scanner means along the linear pattern at a predetermined scanning rate and for rotating the cam blank relative to the cutter means about said axis at a rotation rate proportional to said scanning rate; and means operatively associated with said scanner means and said first and second mounting means for providing relative movement between the rotary cam blank and said cutter in the direction of said plane for cutting said rotary pattern in said plane, and said last mentioned means being responsive to the instantaneous lateral changes sensed thereby for varying the radial cutting distance as a function of instantaneous lateral displacement of said linear pattern from said reference line.

6. Apparatus for forming a cam blank into a cam having a rotary pattern corresponding to a given linear pattern, including:

scanner means for traversing the linear pattern and for sensing the instantaneous lateral changes thereof relative to a predetermined reference line;

cutter means for cutting the cam blank at an incision point displaced from an axis of said cam blank;

drive means for moving said scanner means along the linear pattern at a predetermined scanning rate and rotating the cam blank relative to the cutter means about said axis at a rotation rate proportional to said scanning rate said drive means including means for varying said scanning rate relative to said rate of rotation of said cam blank; and means operatively associated with said scanner means and responsive to the instantaneous lateral changes sensed thereby for varying the radial cutting distance as a function of instantaneous lateral displacement of said linear pattern from said reference line.

7. Apparatus as in claim 6 wherein said drive means includes means for reversing the direction of scanning relative to the direction of rotation of said cam blank.

8. Apparatus for forming a cam including:

a template having an edge defining a given linear pattern relative to a predetermined reference line on said template;

first drive means for moving said template at a predetermined rate in a scanning direction parallel to said reference line;

a tracer stylus adapted to contact said edge of said template to sense its lateral displacement relative to said reference line;

a cam blank;

cutter means for cutting said cam blank at an incision point having a radial cutting distance measured from an axis of said cam blank;

second drive means for rotating said cam blank about said axis at a rate proportional to said predetermined rate of movement of said template; and means responsive to operation of said stylus for varying the radial cutting distance of said incision point to continually maintain said radial cutting distance proportional to said instantaneous lateral displacement of said edge of said template as sensed by said tracer stylus, whereby simultaneous rotation of said cam blank and variation of said radial cutting distance enables said cutting member to cut and form a rotary pattern corresponding to said linear pattern defined by said edge of said template.

9. Apparatus as in claim 8 wherein said means for varying said radial cutting distance includes:

hydraulic piston means for moving said cam blank relative to said cutter means and in a radial direction passing through said incision point; and valve means for controlling the movement of said hydraulic piston means, said valve means being actuated by changes in said instantaneous lateral displacement of said edge of said template as sensed by said tracer stylus.

10. The apparatus of claim 8 further including:

mounting means for securing said template in a new position after a first scan of said pattern with said reference line parallel to said scanning direction; and prepositioning means for moving said template and mounting means laterally relative to said stylus to bring said edge of said template against said stylus at a point having a displacement from said reference line identical to the displacement of a terminal point on said edge at the completion of said first scan.

11. The apparatus of claim 10 wherein said prepositioning means further includes means for moving said template in said scanning direction.